United States Patent
Bhat et al.

(10) Patent No.: US 11,029,931 B2
(45) Date of Patent: *Jun. 8, 2021

(54) BUNDLE ADMINISTRATION AND MANAGEMENT

(71) Applicant: AirWatch LLC, Atlanta, GA (US)

(72) Inventors: Manjunath Bhat, Bangalore (IN); Ramani Panchapakesan, Bangalore (IN); Anand Balasubramanian, Bangalore (IN); Sridhara Babu Kommireddy, Atlanta, GA (US); Anil Jagarlamudi, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/233,594

(22) Filed: Dec. 27, 2018

(65) Prior Publication Data
US 2019/0129703 A1 May 2, 2019

Related U.S. Application Data

(63) Continuation of application No. 14/687,951, filed on Apr. 16, 2015, now Pat. No. 10,198,253.

(30) Foreign Application Priority Data

Dec. 30, 2014 (IN) .......................... 6739/CHE/2014

(51) Int. Cl.
*G06F 9/44* (2018.01)
*G06F 8/61* (2018.01)

(52) U.S. Cl.
CPC . *G06F 8/61* (2013.01); *G06F 8/62* (2013.01)

(58) Field of Classification Search
CPC ........................................................ G06F 9/44
See application file for complete search history.

(56) References Cited

U.S. PATENT DOCUMENTS

| | | | |
|---|---|---|---|
| 6,697,837 B1 | 2/2004 | Rodov | |
| 7,237,017 B1 | 6/2007 | Pecus et al. | |
| 8,990,809 B1* | 3/2015 | Jacob | G06F 9/45533 718/1 |
| 9,448,780 B1 | 9/2016 | Hall | |
| 2001/0029605 A1 | 10/2001 | Forbes et al. | |

(Continued)

*Primary Examiner* — Jae U Jeon
(74) *Attorney, Agent, or Firm* — Thomas | Horstemeyer LLP

(57) ABSTRACT

Aspects of bundle administration and management are described. The use of bundles, as described herein, may be relied upon to assist users with the installation of applications associated with artifacts. In one embodiment, a bundle includes both a manifest and an artifact. A computing device may open the bundle and parse the manifest to identify an application for the artifact. The computing device may evaluate a status of a qualification to the application and, if the status meets the qualification, then install the application. Thus, with the combination of the manifest and the artifact in the bundle, it is not necessary that a user search for and identify an application associated with the artifact (e.g., a data or content file), because the computing device may reference the manifest to ascertain the application and, based upon one or more qualifications, for example, install the application automatically for the user.

20 Claims, 4 Drawing Sheets

(56) References Cited

U.S. PATENT DOCUMENTS

| | | | |
|---|---|---|---|
| 2002/0131428 A1* | 9/2002 | Pecus | H04L 12/1836 370/401 |
| 2003/0220883 A1 | 11/2003 | Block et al. | |
| 2005/0044423 A1 | 2/2005 | Mellmer et al. | |
| 2006/0206449 A1* | 9/2006 | Fletcher | G06F 8/65 |
| 2007/0060305 A1 | 3/2007 | Amaitis et al. | |
| 2007/0261018 A1 | 11/2007 | Sanghvi et al. | |
| 2008/0134018 A1* | 6/2008 | Kembel | H04L 67/306 715/234 |
| 2008/0228513 A1* | 9/2008 | McMillan | G06F 21/105 705/1.1 |
| 2008/0313302 A1* | 12/2008 | Heyworth | G06F 16/40 709/217 |
| 2010/0185686 A1 | 7/2010 | Weigert et al. | |
| 2012/0079471 A1 | 3/2012 | Vidal et al. | |
| 2012/0159423 A1* | 6/2012 | Becker | G06F 9/44526 717/102 |
| 2012/0159468 A1* | 6/2012 | Joshi | G06F 8/61 717/172 |
| 2012/0167111 A1 | 6/2012 | Fortune et al. | |
| 2013/0055273 A1 | 2/2013 | Hong et al. | |
| 2013/0311613 A1* | 11/2013 | Aleksandrov | G06F 8/65 709/219 |
| 2014/0033198 A1* | 1/2014 | Umapathy | G06F 8/61 717/176 |
| 2015/0052450 A1 | 2/2015 | Goldberg et al. | |
| 2015/0295879 A1* | 10/2015 | Jung | H04L 51/32 709/204 |
| 2016/0085765 A1 | 3/2016 | Verma | |
| 2016/0171188 A1* | 6/2016 | Chow | G06F 21/10 726/28 |
| 2016/0253170 A1* | 9/2016 | Fardig | G06F 8/658 717/170 |

* cited by examiner

BUNDLE ADMINISTRATION AND MANAGEMENT

CROSS-REFERENCE TO RELATED APPLICATIONS

This application is a continuation of U.S. patent application Ser. No. 14/687,951, entitled "BUNDLE ADMINISTRATION AND MANAGEMENT," filed Apr. 16, 2015, which claims priority to IN Application No. 6739/CHE/2014, entitled "BUNDLE ADMINISTRATION AND MANAGEMENT", filed Dec. 30, 2014, the entire disclosures of which are hereby fully incorporated herein by reference.

BACKGROUND

In computing devices, certain applications may be relied upon to open, view, and edit data files of various types and/or formats. As examples, a text editor application may be configured to open, view, and edit text files, while an image editor application may be configured to open, view, and edit image files. Generally, different types of data files may be distinguished by different file extensions. Similarly, a computing device may have several different programs installed to open the different types of data files, as directed by a user of the computing device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
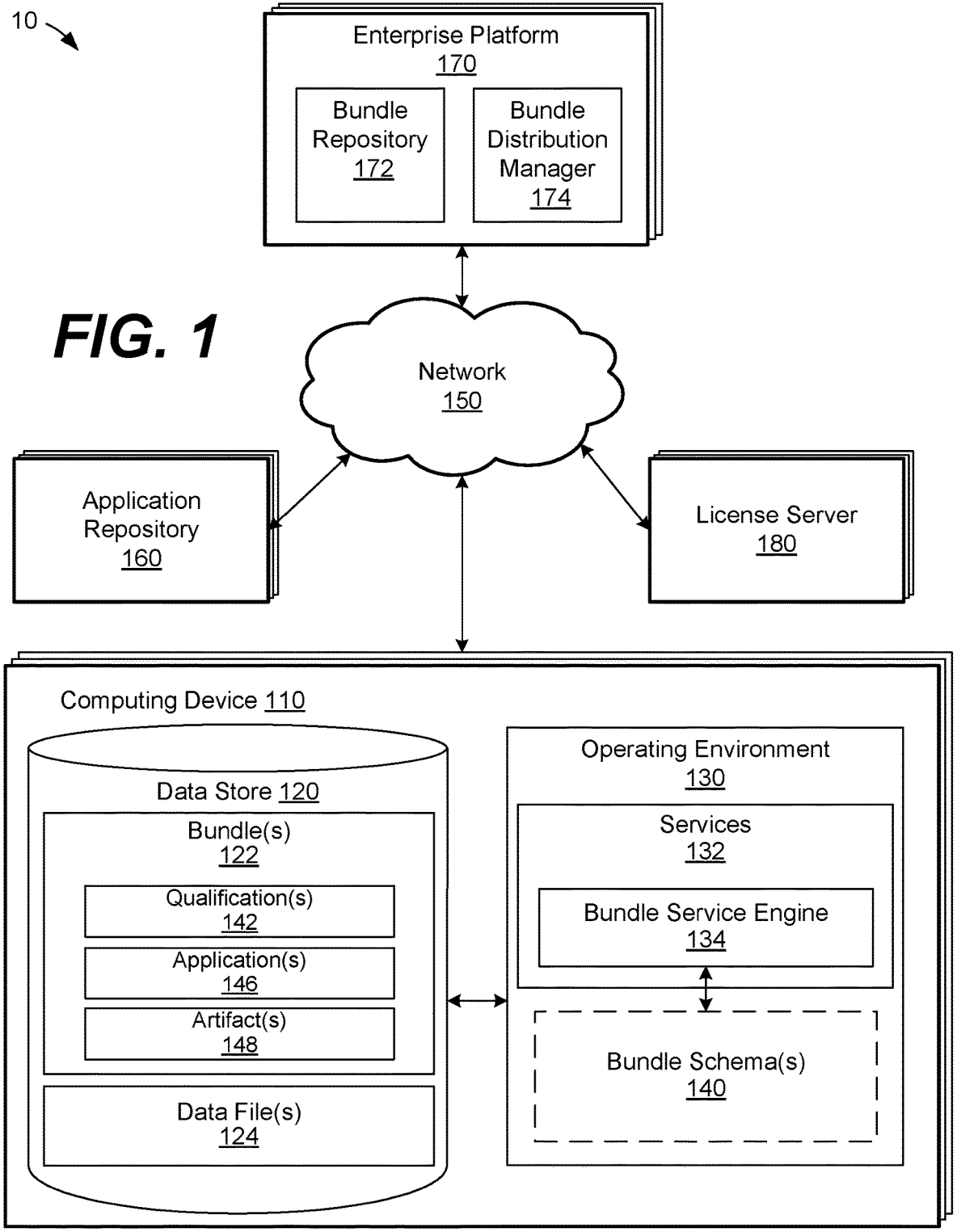
FIG. 1 illustrates a networked computing environment for bundle administration and management according to various embodiments described herein.

As described above, in computing devices, certain applications may be relied upon to open, view, and edit data files of various types and/or formats. In some cases, a content file, such as a video file compressed according to a particular compression format, may be stored at a computing device. If the associated video player application is not installed at the computing device, the computing device may not be able to open the video file. Further compounding this problem, a user of the computing device may be completely unfamiliar with which application is designed and configured to open the video file. As such, the user may need to search for the application associated with the extension of the video file (e.g. *.flv, *.mov, *.wmv, *.mp4, *.3gp, etc.), leading to frustration and lost time. Although good practice may dictate that data files are provided with filename extensions that help users identify which applications are associated with the data files, the filename extensions may be incorrectly or improperly provided, corrupted, or otherwise lost. In this case, it may not be possible to easily search for applications associated with data files.

Further, with the adoption of new types of client computing devices and cross-computing-platform solutions, new ways of administering and managing content and applications are needed. For example, it may be necessary to distribute a certain type of document to employees of a company that relies upon an enterprise of various types of computing devices. Among the computing devices, an application configured to view the document may be installed to only a limited number of the devices. As such, it may be necessary for a significant number of employees to not only receive the document, but also to search for and install the associated application before they are able to view the document. The need to search for and install the application may consume a great amount of the employees' time and lead to frustration and calls for assistance.

As another example, it may be necessary to distribute various documents and a test, electronically, to students in a classroom. According to the instructor's lesson plan, the documents should be reviewed, in sequence, before the test is taken. Without a way to manage access to the documents and the test, the students may take the test without reviewing the documents first.

In the context of the examples presented above, the use of bundles, as described herein, may be relied upon to assist with the managed distribution of artifacts and the installation of applications associated with the artifacts, along with the ability to conditionally control access to the artifacts according to various qualifications. As used herein, an artifact may be embodied as or refer to any data file, content file, user profile, computing device profile, license, or other data file (or combinations thereof) which may be opened, edited, viewed, installed, or integrated with a computing device. In one embodiment, a bundle includes both a manifest and an artifact. A computing device may open the bundle and parse the manifest to identify an application for the artifact and a qualification to the application and/or to the artifact. The computing device may evaluate a status of the qualification to the application pursuant to the manifest and, if the status meets the qualification to the application, then install the application on the computing device. The computing device may reference the manifest to identify a pointer to a location from which the application (and/or the artifact) may be downloaded, for example, and then download and install the application. Further, if the manifest defines it, the computing device may also evaluate a status of a qualification to the artifact. If the status meets the qualification to the artifact, then the computing device may permit access to the artifact using the application. Otherwise, the computing device may deny access to the artifact.

Thus, with the combination of a manifest and an artifact in a bundle, among other data structures, it is not necessary that a user search for and identify an application associated with the artifact, because the computing device may reference the manifest to ascertain the application. Further, based upon one or more qualifications, the computing device may install the application automatically for the user, control access to the artifact based on certain conditions, and/or control access to the application based on certain conditions. Additional features of and variations on bundles and computing devices configured to implement bundle schemas using bundles are described in further detail below. In that context, the following paragraphs provide a general description of a representative networked computing environment and its components followed by a discussion of the operation of the same.

FIG. 1 illustrates a networked computing environment 10 for bundle administration and management according to various embodiments described herein. The networked computing environment 10 includes a computing device 110, a network 150, an application repository 160, an enterprise platform 170, and a license server 180. The computing device 110 is representative of one or more computing devices. In various embodiments, the computing device 110 may be embodied as any computing or processing circuitry, device, or system, including those embodied in the form of a desktop computer, a laptop computer, a personal digital assistant, a wearable computing device, a cellular telephone, a camera, a set-top box, a music or media player, or a tablet computer, among other example computing devices or systems, without limitation. Depending upon its primary purpose or function, the computing device 110 may include various peripheral devices or components. The peripheral devices may include input or communications devices or modules, such as keyboards, keypads, touch pads, touch screens, microphones, cameras, wireless communications modules (e.g., infra-red, WI-FI, Bluetooth®, etc.), buttons, switches, sensors, etc. The peripheral devices may also include a display, indicator lights, speakers, global navigation satellite system (GNSS) circuitry, accelerometers, gyroscopes, etc., depending upon the primary purpose or function of the computing device 110.

In other embodiments, the computing device 110 may be embodied as a computing system including one or more computing devices arranged, for example, in one or more server or computer banks. The computing device 110 may be located at a single installation site or distributed among different geographic locations. In this context, the computing device 110 may include a plurality of computing devices that together embody a hosted computing resource, a grid computing resource, and/or other distributed computing arrangement. In some cases, the computing device 110 may be embodied as an elastic computing resource where an allotted capacity of processing, network, storage, or other computing-related resources varies over time. The computing device 110 may also include or correspond to one or more virtualized server instances that are created in order to execute the functionality described herein. The computing device 110 may also be embodied, in part, as various logic (e.g., processing circuit or device) and/or functional (e.g., computer-readable instruction) elements that may execute or be executed by the computing device 110 to direct the computing device 110 to perform aspects of the embodiments described herein.

As illustrated, the computing device 110 includes a data store 120 and an operating environment 130. Among other storage areas, the data store 120 includes a storage area for one or more bundles 122 and a storage area for one or more data files 124. Any one of the bundles 122 may be distinguished from a data file 124 because it includes certain data structures in addition to one or more artifacts (e.g., data files, content files, user profiles, computing device profiles, licenses, etc.) and/or, in some cases, one or more applications. In one embodiment, for example, a bundle 122 includes a manifest as described in further detail below with reference to FIG. 2.

The operating environment 130 may be configured to execute various programs as directed by a user. Although the execution of applications is described below in the context of the bundles 122, the operating environment 130 may execute various applications beyond those described in connection with the bundles 122 and other artifacts. The operating environment 130 includes services 132, and the services 132 include a bundle service engine 134. The services 132 may include any services executing on the computing device 110, such as network communications services, update services, monitoring services, event services, logging services, policy services, etc. The bundle service engine 134 is an example of one of the services 132 and may be configured to individually administer and manage the bundles 122 stored in the data store 120. More particularly, the bundle service engine 134 may administer and manage the bundles 122 according to one or more bundle schemas 140, where each of the bundle schemas 140 is defined based on a manifest, including the qualifications 142, for example, in one or more of the bundles 122.

In one embodiment, the bundle service engine 134 may be configured to parse a manifest of any of the bundles 122 to identify one or more applications 146 associated with one or more artifacts 148 (e.g., data files, content files, user profiles, computing device profiles, licenses, etc.) contained within the bundle 122. For example, the bundle service engine 134 may be configured to install an application 146 on the computing device 110 and open an artifact 148 of the bundle 122 using the installed application 146. In this way, by referencing the manifest in the bundle 122, it is not necessary that a user search for and identify the associated application 146, as may be the case for certain ones of the data files 124 for which no associated application is known. Stated differently, the bundle service engine 134 may be configured to reference the manifest in the bundle 122, ascertain the application 146 as being associated with the artifact 148, and automatically install the associated application 146 on the computing device 110 so that the artifact 148 may be opened. In some embodiments, not only does the manifest identify the application 146, but the manifest may provide an absolute or relative pointer or resource locator from which the bundle service engine 134 may obtain a copy of the application 146. Thus, for example, the manifest may include a uniform resource locator (URL) that points to a path location in the application repository 160 for the application 146.

As noted above, the bundle service engine 134 may be configured to administer and manage the bundles 122 according to one or more bundle schemas 140, where each of the bundle schemas 140 is defined based on the qualifications 142 in the bundles 122. Upon accessing and parsing each of the bundles 122, the operating environment 130 may implement one or more of the bundle schemas 140 for reference in association with management of the bundles 122. Once implemented, the bundle service engine 134 may manage the installation and operation of the application 146 and/or the artifact 148, for example, according to a bundle schema 140. In this case, the bundle service engine 134 may identify the qualification 142 and implement the bundle schema 140 based on the qualification 142. The bundle service engine 134 may be further configured to evaluate a status of the qualification 142 pursuant to the bundle schema 140 and, if the status meets the qualification 142, then install the application 146 on the computing device 110. As further described below with reference to FIG. 2, the qualifications 142 may additionally define conditions for access to the artifacts 148 or other aspects of the bundles 122.

The network 150 may include the Internet, intranets, extranets, wide area networks (WANs), local area networks (LANs), wired networks, wireless networks, cable networks, satellite networks, other suitable networks, or any combinations thereof. The computing environment 110 may communicate with other network elements using various protocols such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), and/or other protocols for communicating data over the network 150, without limitation. The network 150 may include connections to any number and type of network hosts, such as website servers, file servers, cloud computing resources, databases, data stores, or any other network or computing architectures.

The application repository 160 may be embodied as a computer, computing device, or computing system that operates as a repository (e.g., host) for applications which may be installed at various computing devices including the computing device 110. In some embodiments, the application repository 160 may host data other than applications, such as content files, user profiles, computing device profiles, licenses, or other data files (or combinations thereof) which may be opened, edited, viewed, installed, or integrated with a computing device. The computing device 110 and the application repository 160 may communicate data between each other via the network 150.

The enterprise platform 170 may be embodied as a computer, computing device, or computing system that operates as a management enterprise platform for a company or organization. For example, the enterprise platform 170 may manage a document, content, license, profile, or other management and/or distribution service for the company or organization. The computing device 110 and the enterprise platform 170 may communicate data between each other via the network 150. As illustrated, the enterprise platform 170 includes a bundle repository 172 and a bundle distribution manager 174. Because the enterprise platform 170 distributes the bundles 122, the enterprise platform 170 may be considered a bundle management server. The bundle repository 172 operates as a repository (e.g., host) of bundles, including the bundles 122, for example, which may be communicated to the computing device 110 via the network 150 and stored in the data store 120. The bundle distribution manager 174 may be configured to manage the distribution of bundles to the computing device 110, for example.

The license server 180 may be embodied as a computer, computing device, or computing system that monitors, distributes, and maintains licenses for various applications. The computing device 110 and the license server 180 may communicate data between each other via the network 150. The computing device 110 may reference the license server 180, as necessary, to determine whether licenses for one or more applications are valid or to obtain a valid license for one or more applications, for example.

Figure 2:
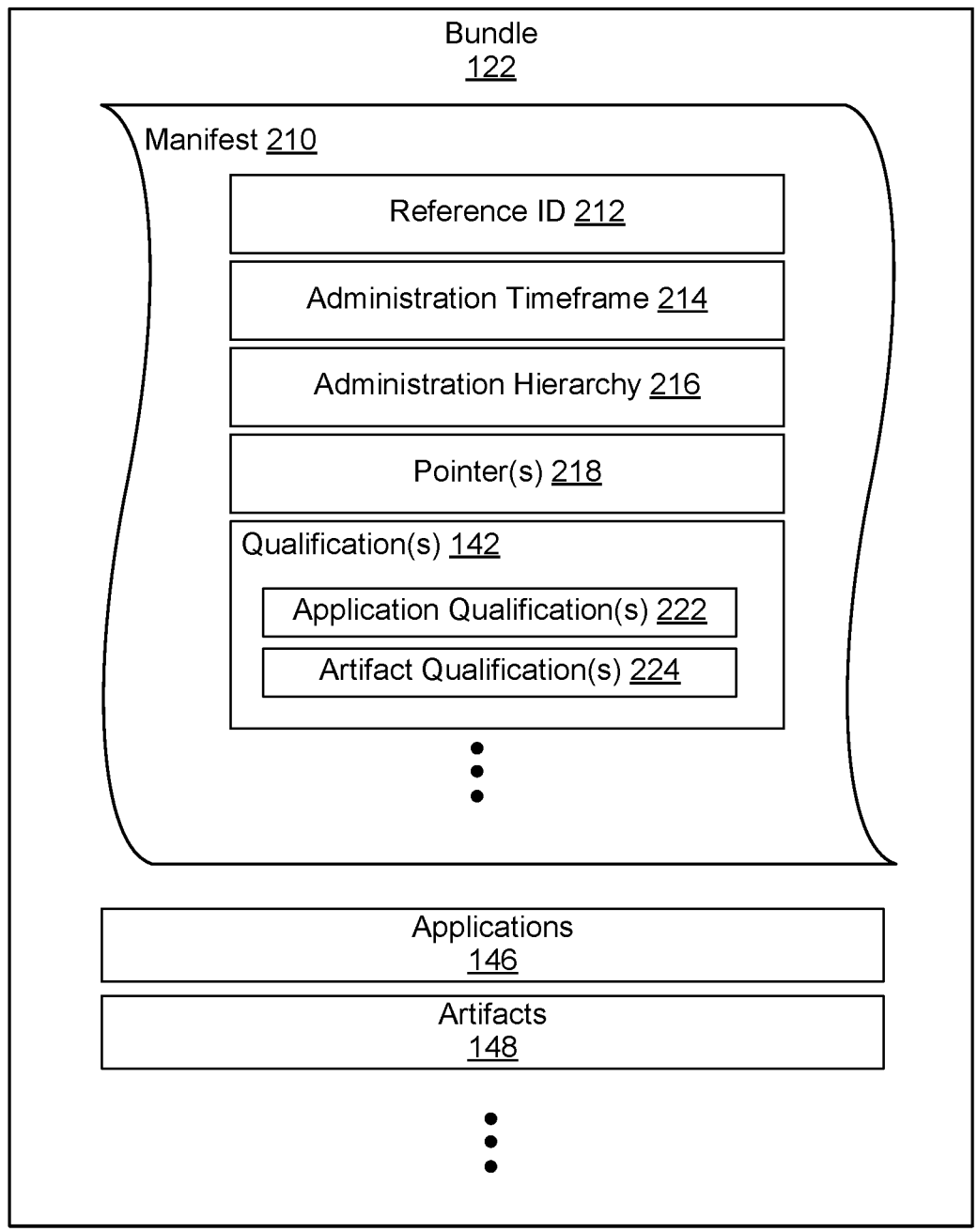
FIG. 2 illustrates example contents of a bundle in the networked computing environment in FIG. 1 according to various embodiments of the present disclosure.

Turning to FIG. 2, contents of an example bundle 122 are illustrated. The bundle 122 in FIG. 2 is provided as a representative example of one of the bundles 122 in FIG. 1. The bundle 122 may include a manifest 210, one or more applications 146, and one or more artifacts 148. As illustrated, the manifest 210 may include a reference identifier 212, an administration timeframe 214, an administration hierarchy 216, one or more pointers 218, and one or more qualifications 142. The qualifications 142 may include application qualifications 222 and artifact qualifications 224. The data structures illustrated in the bundle 122 are provided by way of example and not limitation, and one or more of the data structures may be omitted in certain cases. For example, the administration timeframe 214, administration hierarchy 216, and/or the applications 146 may be omitted from the bundle 122. As another example, one or both of the application qualifications 222 and/or the artifact qualifications 224 may be omitted from the bundle 122.

The reference ID 212 may be embodied as a unique identifier for the bundle 122. In some embodiments, the reference ID 212 may include a bundle version number, version date, etc. Using the reference ID 212, the bundle service engine 134 (FIG. 1) may query the enterprise platform 170 for an update to the bundle 122, as further described below with reference to FIG. 3. The administration timeframe 214 may be embodied as a data structure including one or more timings or time periods for administration of the bundle 122. In this context, the bundle service engine 134 may administer a bundle schema 140 for the bundle 122 during one or more timings or time periods defined by the administration timeframe 214. For example, the bundle service engine 134 may be configured to review the qualifications 142 in the bundle 122 during a time period defined by the administration timeframe 214 and, when the time period expires, delete one or more of the artifacts 148, uninstall one or more of the applications 146, and/or delete the bundle 122. As another example, the bundle service engine 134 may be configured to install, update, or delete one of the applications 146 in the bundle 122 at a certain time defined by the administration timeframe 214. In still another example, the bundle service engine 134 may be configured to determine certain times when one or more of the artifacts 148 and/or the applications 146 may be accessed or executed according to the administration timeframe 214.

The administration hierarchy 216 may be embodied as a data structure including a priority or operating hierarchy for administration of the artifacts 148 and/or the applications 146 in the bundle 122. In this context, the bundle service engine 134 may identify an order for access to the artifacts 148 according to the administration hierarchy 216. That is, with reference to the administration hierarchy 216, the bundle service engine 134 may identify that a first artifact should be opened and reviewed by a user before a second artifact. Thus, if a teacher distributes several documents to students in a classroom, the teacher may define, through the administration hierarchy 216, that a first of the documents is reviewed, entirely or in part, before a second of the documents is reviewed. Similarly, the teacher may define that certain documents are reviewed before an application 146 is installed or executed. The bundle service engine 134 may reference both the administration hierarchy 216 and the qualifications 142 to determine not only an order in which the artifacts 148 and/or the applications 146 should be accessed, but also certain conditions in which they should be accessed.

The pointers 218 may be embodied as one or more references to the applications 146 and/or to the artifacts 148. Thus, if the bundle 122 omits the applications 146, the bundle service engine 134 may reference the pointers 218 to identify one or more of the applications 146 to open, view, and edit the artifacts 148. Thus, based on the content in the bundle 122, it is not necessary for a user search for and identify the applications 146 to access the artifacts 148. Instead, the bundle service engine 134 may reference the pointers 218 to identify the applications 146. Further, the pointers 218 may also include one or more absolute or relative pointers or resource locators from which the bundle service engine 134 may obtain a copy of one or more of the applications 146 to access the artifacts 148. A pointer 218 in the manifest 210 may include a URL, for example, that points to a location in the application repository 160 from which a computing device may obtain a copy of an application 146. Thus, if the bundle 200 omits the applications 146, one or more of the pointers 218 may identify certain applications 146 associated with respective ones of the artifacts 148. Similarly, if the bundle 122 omits the artifacts 148, the bundle service engine 134 may reference the pointers 218 to identify a network location from which the computing device may obtain a copy of one or more of the artifacts 148. The bundle service engine 134 may also reference the pointers 218 to obtain copies of the applications 146 and/or the artifacts 148 in a sequence defined by the administration hierarchy 216 and/or the qualifications 142.

The qualifications 142 may be embodied as one or more conditions or qualifications to the artifacts 148 and/or the applications 146. More particularly, the application qualifications 222 may be embodied as one or more conditions or qualifications to the applications 146, and the artifact qualifications 224 may be embodied as one or more conditions or qualifications to the artifacts 148. Among others, the application qualifications 222 may define operating environment dependencies for the applications 146, license dependencies for the applications 146, profile dependencies for the applications 146, hierarchy dependencies for the applications 146, etc. For example, the operating environment dependencies may require that certain system software updates have been installed (e.g., patches, bug fixes, etc.), that certain services or applications are being executed (e.g., antivirus software, etc.), or that a certain amount of network bandwidth, memory, or disk space is available. The license dependencies may require that one or more application licenses are verified and valid, the profile dependencies may require that one or more user profiles are available, accurate, and updated, and the hierarchy dependencies may require that a set or suite of applications is installed or installed in a certain order. The bundle service engine 134 may reference the application qualifications 222 to determine what conditions, qualifications, or pre-requisites may be associated with the installation of or access to the applications referenced by the pointers 218 or the applications 146, for example.

The artifact qualifications 224 may define certain operating environment dependencies for the artifacts 148, profile dependencies for the artifacts 148, pre-requisites for access to the artifacts 148, etc. The bundle service engine 134 may reference the artifact qualifications 224 to determine what conditions, qualifications, or pre-requisites may be associated with access to the artifacts 148. For example, the operating environment dependencies may require that certain system software updates have been installed (e.g., patches, bug fixes, etc.), that certain services or applications are being executed (e.g., antivirus software, etc.), or that a certain amount of network bandwidth, memory, or disk space is available. The profile dependencies may require that one or more user profiles are available, accurate, and updated, and the pre-requisites may require that certain applications are installed, that certain documents have been accessed and/or reviewed, and that certain terms and conditions have been accepted.

Figure 3:
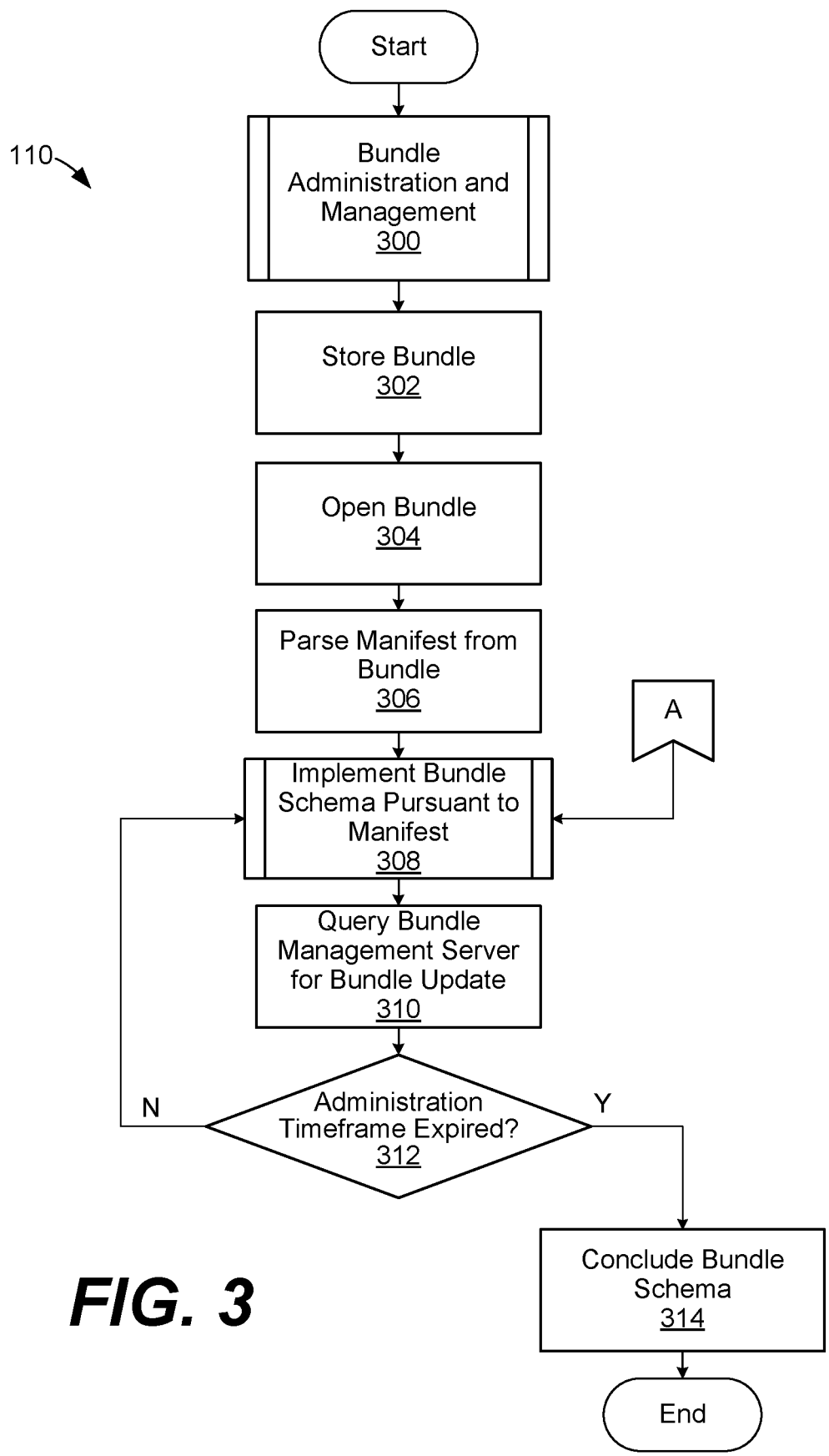
FIG. 3 illustrates an example bundle administration and management process performed by the computing device in FIG. 1 according to various embodiments of the present disclosure.
Figure 4:
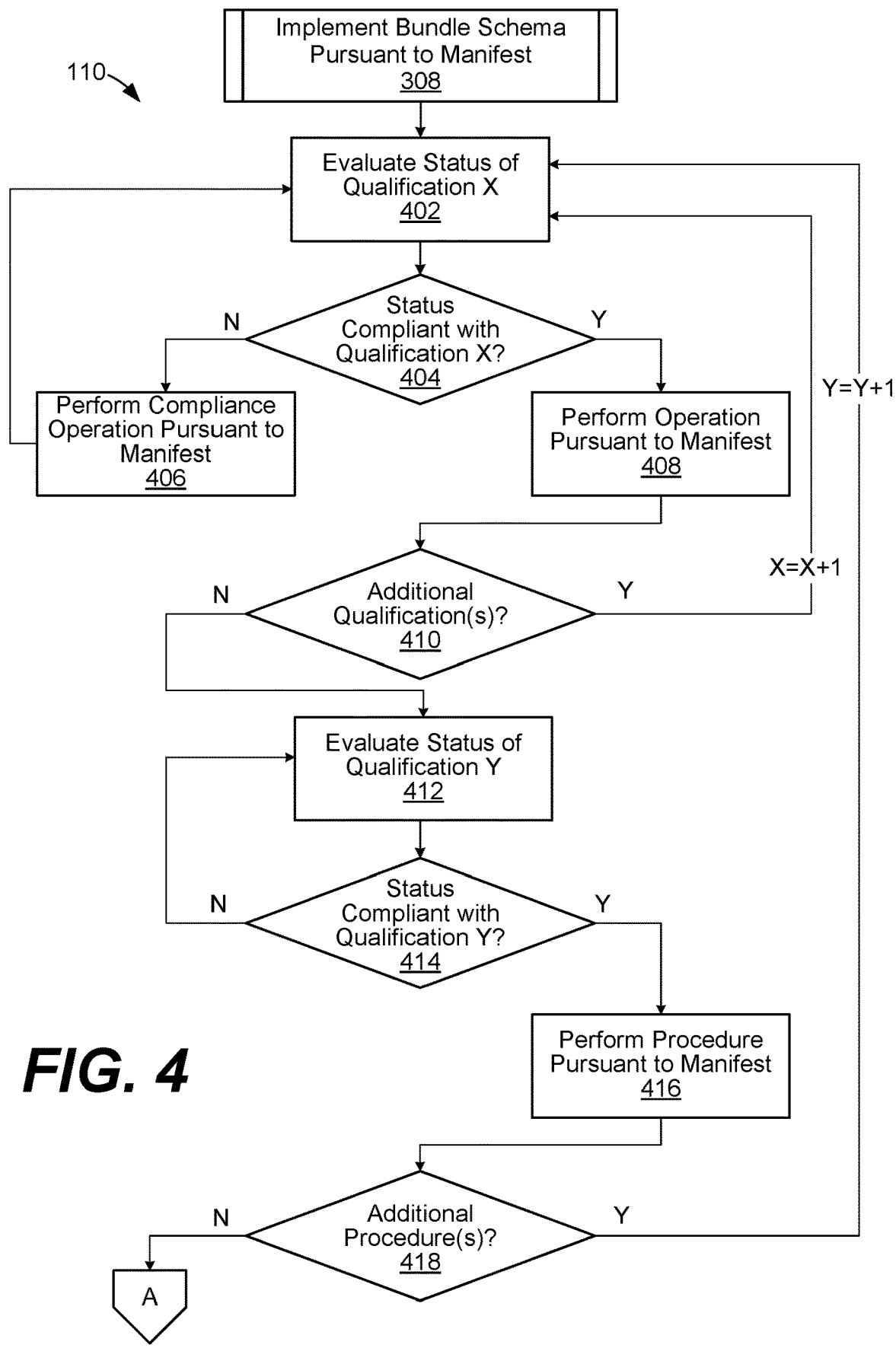
FIG. 4 illustrates an expanded view of a process of implementing a bundle schema according to various embodiments of the present disclosure.

Turning to FIGS. 3 and 4, the operation of the bundle service engine 134 (FIG. 1) in the computing device 110 is described in further detail by way of various examples. FIG. 3 illustrates an example bundle administration and management process 300 performed by the computing device 110 in FIG. 1. Although the process 300 is described below as being performed by the computing device 110 in FIG. 1, it should be appreciated that the bundle administration and management process 300 may be performed by other computing devices and/or systems.

Starting at reference numeral 302, the process 300 includes storing one or more of the bundles 122. Referring to FIG. 1, the computing device 110 may receive one or more of the bundles 122 from the enterprise platform 170 at reference numeral 302, for example, and store the bundles 122 in the data store 120. At reference numeral 304, the process 300 includes opening one or more of the bundles 122 stored at reference numeral 302. In this context, the computing device 110 may receive an instruction from a user to open one of the bundles 122. In turn, the bundle service engine 134 may identify the instruction to open the bundle 122. Based on the instruction, the bundle service engine 134 may open the bundle 122 to access and identify the contents of the bundle 122. As described above with reference to the example bundle 122 in FIG. 2, the bundle 122 may include a manifest 210, one or more artifacts 148, and one or more applications 146, among other data structures.

At reference numeral 306, the process 300 includes parsing the manifest 120 from the bundle 122 opened at reference numeral 304. Referring to FIG. 2 for example context, when parsing the manifest 210 at reference numeral 306, the bundle service engine 134 may identify one or more of the reference identifier 212, the administration timeframe 214, the administration hierarchy 216, the pointers 218, the qualifications to applications 222, and/or the qualifications to artifacts 224, for example.

At reference numeral 308, the process 300 includes implementing a bundle schema 140 pursuant to the manifest 210 parsed at reference numeral 306. Here, the bundle service engine 134 may implement a bundle schema 140 by performing a series of operations according to the hierarchy, timings, pointers, qualifications, conditions, etc. identified in the manifest file 210. The implementation of a bundle schema 140 at reference numeral 308 is described in further detail below with reference to FIG. 4.

At reference numeral 310, the process 300 includes querying a bundle management server for an update to the bundle opened at reference numeral 304. For example, at reference numeral 310, the bundle service engine 134 may query the enterprise platform 170 (FIG. 1) to determine whether an updated version of the bundle 122 opened at reference numeral 304 exists. When conducting the query, the bundle service engine 134 may identify the bundle 122 opened at reference numeral 304 by its reference identifier 212 and/or version number. In response, the bundle distribution manager 174 may determine whether an update to the bundle 122 exists. If an update does exist, the bundle distribution manager 174 may forward the updated bundle 122 to the computing device 110. In various embodiments, querying for an update, as performed at reference numeral 310, may be performed at other times in the process 300. For example, querying for an update may be performed before or after reference numeral 304, for example, or at any other suitable point or timing in the process 300.

At reference numeral 312, the process 300 includes determining whether an administration timeframe 214 has expired for the bundle 122 opened at reference numeral 304. In other words, at reference numeral 312, the bundle service engine 134 is configured to check whether the timeframe for administration of the bundle schema 140 implemented at reference numeral 308 (see also, e.g., FIG. 4) has expired. The administration timeframe 214 may be defined in the manifest 210 of the bundle 122 opened at reference numeral 304 by way of an absolute or relative start time, end time, time period, etc. If the administration timeframe 214 has expired, then the process 300 proceeds from reference numeral 312 to reference numeral 314, where the administration of the bundle 122 opened at reference numeral 304 is concluded. At reference numeral 314, pursuant to the manifest 210 parsed at reference 306, the bundle service engine 134 may uninstall any applications 146 installed at reference numeral 308 and, in some cases, delete the bundle 122 opened at reference numeral 304. As such, at reference numeral 314, the bundle service engine 134 concludes the administration of the bundle 122 opened at reference numeral 304. Alternatively, if the administration timeframe 214 has not expired, then the process 300 proceeds from reference numeral 312 back to reference numeral 308 for ongoing implementation of the bundle schema 140.

With regard to the administration timeframe 214, it is noted that a bundle 122 may, in some embodiments, be limited to administration for a limited period of time. For example, if the administration timeframe 214 in the bundle 122 limits administration to no later than Jan. 1, 2015, at 12:00 am, then the bundle service engine 134 may conclude administration of the bundle 122 at that time. In this case, the bundle service engine 134 may deny or refuse access to the bundle 122 after Jan. 1, 2015, at 12:00 am. In other cases, with reference to the administration timeframe 214, the bundle service engine 134 may begin administration of the bundle 122 at a certain time period. In still other embodiments, the administration timeframe 214 may define respective timings or timeframes for administration of one or more of the applications 146 or other applications referenced by the pointers 218, and the bundle service engine 134 may operate accordingly. Additionally or alternatively, the administration timeframe 214 may define respective timings or timeframes for access to the artifacts 148. In other embodiments, however, administration of one or more of the bundles 122 may not be limited. That is, the administration timeframe 214 may be omitted from one or more of the bundles 122. In this case, a bundle schema 140 for a bundle 122 may be implemented by the bundle service engine 134 without reference to any particular timeframe.

FIG. 4 illustrates an expanded view of the process of implementing a bundle schema 140 (i.e., reference numeral 308 in FIG. 3). At the outset, it is noted that the process in FIG. 4 is implemented for a particular bundle 122 according to the manifest 210 in the bundle 122. In other words, the manifest 210 of a bundle 122 generally defines the manner in which the bundle schema 140 associated with the bundle 122 is implemented. In this context, after the bundle service engine 134 (FIG. 1) parses the manifest 210 of a bundle 122 at reference numeral 306 (FIG. 3), the bundle service engine 134 is configured to implement a bundle schema 140 for the bundle 122 according to the hierarchy, timings, pointers, qualifications, conditions, etc. defined in the manifest file 210. An example process of implementing the bundle schema 140 is outlined in FIG. 4.

At reference numeral 402, the process includes evaluating a status of a qualification (e.g., qualification x). At this stage, before a certain application is installed, for example, the bundle service engine 134 may evaluate or verify one of various qualifications or conditions. Referring to FIG. 2 for example context, the bundle 122 includes application qualifications 222 as described above. At reference numeral 402, the bundle service engine 134 may evaluate or verify one or more of the application qualifications 222 before installing certain applications. For example, the bundle service engine 134 may evaluate or verify a condition of the operating environment 130 of the computing device 110, an operating profile of the computing device 110, a license to the computing device 110, a condition of a registry entry in the computing device 110, a file structure in the computing device 110, etc. In other examples, the qualification may be related to conditions on a network environment (e.g., network type, network speed, network address, network geofence, virtual local area network affiliation, etc.), time of day, system resources, user, etc. As illustrated in FIG. 4, the evaluation of the status of respective qualifications (e.g., qualifications x, x+1, x+2, etc.) may occur in a nested fashion. Alternatively, the evaluation of a combination of two or more qualifications may occur at reference numeral 402.

At reference numeral 404, the process includes determining whether the status of the qualification evaluated at reference numeral 402 is compliant. Here, the bundle service engine 134 may compare the status of the operating environment, operating profile, license, registry entry, etc., as evaluated at reference numeral 402, with one or more of the application qualifications 222 (FIG. 2), for example. If the status is not compliant, then the process proceeds to reference numeral 406. On the other hand, if the status is compliant, then the process proceeds to reference numeral 408.

At reference numeral 406, the process includes performing a compliance operation pursuant to the manifest 210. For example, as directed by the manifest 210 (FIG. 2), the bundle service engine 134 may update or edit one or more operating parameters of the computing device 110. For example, the bundle service engine 134 may perform a compliance operation to update settings of the operating environment 130 of the computing device 110, an operating profile of the computing device 110, a condition of a registry entry in the computing device 110, a file structure in the computing device 110, etc. The compliance operation may include the installation of certain services, licenses, applications or software, etc. In other examples, at reference numeral 406, the bundle service engine 134 may update security or network settings of the computing device 110. After reference numeral 406, the process proceeds back to reference numeral 402 for further evaluation.

At reference numeral 408, the process includes performing an operation pursuant to the manifest 210. For example, the bundle service engine 134 may install a program or application at reference numeral 408. In various embodiments, the application may be contained within the bundle 122 (e.g., one of the applications 146) or obtained (e.g., downloaded) using one of the pointers 218 in the manifest 210 as a reference to a location where the application may be obtained. With regard to the pointers 218, as described above, the bundle service engine 134 may obtain a copy of an application from the application repository 160 (FIG. 1), for example, using one of the pointers 218 as a reference to a location where the application may be obtained. In other aspects of the embodiments, the operation performed at reference numeral 408 may be an operation other than the installation of an application. Depending upon the manifest 210, for example, the operation performed at reference numeral 408 may include obtaining (e.g., downloading) or deleting certain data files, executing certain instructions, reconfiguring operating parameters of the computing device 110, etc. After reference numeral 408, the process proceeds to reference numeral 410.

At reference numeral 410, the process includes determining whether there are additional qualifications. Here, it is noted that the manifest 210 of the bundle 122 (FIG. 2) may include a series of application qualifications 222 associated with the installation of various applications (or other operations). In this case, when implementing the bundle schema 140 of the bundle 122, the bundle service engine 134 may evaluate the status of each of the application qualifications 222, in turn (or in any combination with each other), depending upon the administration hierarchy 216 of the manifest 210. If the bundle service engine 134 identifies at reference numeral 410 that additional qualifications are listed in the manifest 210 of the bundle 122, then the process proceeds back to reference numeral 402 to evaluate one or more of the additional qualifications (e.g., qualification x+1). On the other hand, if the bundle service engine 134 identifies at reference numeral 410 that no additional qualifications are listed, then the process proceeds to reference numeral 412.

At reference numeral 412, the process includes evaluating a status of a different type of qualification (e.g., qualification y). Referring again to FIG. 2 for example context, before one or more of the artifacts 148 are opened, the bundle service engine 134 may evaluate or verify one or more of the artifact qualifications 224 at reference numeral 412. In one embodiment, the bundle service engine 134 may evaluate or verify one or more of the artifact qualifications 224 before permitting a user to open or access one or more of the artifacts 148. In this context, the bundle service engine 134 may evaluate or verify a pre-requisite for access to the artifacts 148. The pre-requisite may require that a user has previously viewed or accessed one or more other artifacts, completed a task (e.g., watching a video, completing a form, etc.), obtained certain permissions, obtained a license, etc.

At reference numeral 414, the process includes determining whether the status of the qualification evaluated at reference numeral 412 is compliant. Here, the bundle service engine 134 may compare the status of the pre-requisite evaluated at reference numeral 412, with one or more of the artifact qualifications 224 (FIG. 2). If the status is not compliant, then the process proceeds back to reference numeral 412 for further evaluation. On the other hand, if the status is compliant, then the process proceeds to reference numeral 416.

At reference numeral 416, the process includes performing a procedure pursuant to the manifest 210. For example, the bundle service engine 134 may open one or more of the artifacts 148 to be viewed and/or edited by a user, for example, at reference numeral 416. After reference numeral 416, the process proceeds to reference numeral 410. At reference numeral 418, the process includes determining whether there are additional procedures. Here, it is noted that the manifest 210 of the bundle 200 (FIG. 2) may direct the bundle service engine 134 to access one or more of the artifacts 230 over time, under various circumstances, and based on certain conditions or qualifications according to the administration hierarchy 216 of the manifest 210. Thus, to the extent that the manifest 210 includes additional instructions for the bundle service engine 134, the process may proceed back to reference numeral 402. If no additional procedures or instructions are identified at reference numeral 418, the process proceeds back to reference numeral 314 of FIG. 3, to conclude the bundle schema 140.

The process flowcharts in FIGS. 3 and 4 show examples of the functionality and operation of the components described herein. The components described herein can be embodied in hardware, software, or a combination of hardware and software. If embodied in software, each element may represent a module of code or a portion of code that comprises program instructions to implement the specified logical function(s). The program instructions may be embodied in the form of, for example, source code that comprises human-readable statements written in a programming language and/or machine code that comprises machine instructions recognizable by a suitable execution system, such as a processor in a computer system or other system. If embodied in hardware, each element may represent a circuit or a number of interconnected circuits that implement the specified logical function(s).

Although the flowcharts show a specific order of execution, it is understood that the order of execution may differ from that which is shown. For example, the order of execution of two or more elements may be switched relative to the order shown. Also, two or more elements shown in succession may be executed concurrently or with partial concurrence. Further, in some embodiments, one or more of the elements shown in the flowcharts may be skipped or omitted. In addition, any number of counters, state variables, warning semaphores, or messages might be added to the logical flow described herein, for purposes of enhanced utility, accounting, performance measurement, troubleshooting, etc. It is understood that all such variations are within the scope of the present disclosure.

The computing device 110, application repository 160, enterprise platform 170, and license server 180 described in FIG. 1 may each include at least one processing circuit. Such a processing circuit may comprise, for example, one or more processors and one or more storage devices that are coupled to a local interface. The local interface may comprise, for example, a data bus with an accompanying address/control bus or any other suitable bus structure. The one or more storage devices for a processing circuit may store data and/or components that are executable by the one or processors of the processing circuit. For example, the operating environment 130 and/or other components may be stored in one or more storage devices and be executable by one or more processors. Also, a data store, such as the data store 120, may be stored in the one or more storage devices.

The bundle service engine 134 and other components described herein may be embodied in the form of hardware, as software components that are executable by hardware, or as a combination of software and hardware. If embodied as hardware, the components described herein can be implemented as a circuit or state machine that employs any suitable hardware technology. Such hardware technology may include, for example but is not limited to, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs) and complex programmable logic devices (CPLDs)), etc.

Also, one or more of the components described herein that includes software or program instructions may be embodied in any non-transitory computer-readable medium for use by or in connection with an instruction execution system such as, for example, a processor in a computing or processing system. Such a computer-readable medium may contain, store, and/or maintain the software or program instructions for use by or in connection with the instruction execution system.

The computer-readable medium can comprise a physical media, such as, magnetic, optical, semiconductor, and/or other suitable media. Examples of a suitable computer-readable media include, but are not limited to, solid-state drives, magnetic drives, flash memory, etc. Further, any logic or component described herein may be implemented and structured in a variety of ways. For example, one or more components described herein may be implemented as modules or components of a single application. Further, one or more components described herein may be executed in one computing device or in multiple computing devices. Additionally, it is understood that terms, such as "application," "service," "system," "engine," "module," etc., may be interchangeable and are not intended to be limiting unless indicated otherwise.

It is emphasized that the embodiments described above are merely examples of implementations to set forth for a clear understanding of the principles of the disclosure. Many variations and modifications may be made without departing from the spirit and principles of the disclosure. All such modifications and variations are intended to be included within the scope of this disclosure herein.

Therefore, the following is claimed:

1. A non-transitory computer-readable medium embodying program code executable in at least one computing device for bundle management, the program code being configured to cause the at least one computing device to at least:
   receive a bundle over a computer network, the bundle comprising a content file and a manifest to manage access to the content file, wherein the bundle is associated with an enterprise platform operated by a company or organization;
   query a bundle management server for an update to the bundle;
   in an instance in which the at least one computing device is evaluated against a qualification defined in the manifest for installation of an application on the at least one computing device, automatically obtain, over the computer network and by reference to a pointer the enterprise platform provides in the manifest that points to a location in an application repository, the application to open the content file;
   install the application on the at least one computing device; and
   open the content file on the at least one computing device using the application.

2. The non-transitory computer-readable medium of claim 1, wherein:
   the manifest further comprises an administration timeframe for the bundle; and
   the program code is further configured to cause the at least one computing device to at least:
      determine that the administration timeframe for the bundle has expired;
      uninstall the application from the at least one computing device; and
      delete the bundle from the at least one computing device.

3. The non-transitory computer-readable medium of claim 1, wherein:
   the qualification for installation of the application comprises a profile dependency for access to the content file using the application; and
   the program code is further configured to cause the at least one computing device to at least:
      evaluate a status of the profile dependency; and
      open the content file on the at least one computing device based on the status of the profile dependency.

4. The non-transitory computer-readable medium of claim 1, wherein:
   the qualification for installation of the application comprises an operating environment dependency of the at least one computing device for the application; and
   the program code is further configured to cause the at least one computing device to at least:
      verify a condition of the operating environment dependency; and
      install the application on the at least one computing device based on the condition.

5. The non-transitory computer-readable medium of claim 1, wherein:
   the qualification for installation of the application comprises a license dependency for the application; and
   the program code is further configured to cause the at least one computing device to:
      verify an adequacy of at least one license of the at least one computing device pursuant to the license dependency; and
      obtain and install the application for the content file based on the adequacy of the at least one license.

6. The non-transitory computer-readable medium of claim 1, wherein:
   the manifest further comprises a pre-requisite for access to the content file using the application; and
   the program code is further configured to cause the at least one computing device to at least:
      evaluate a status of the pre-requisite for access; and
      open the content file on the at least one computing device based on the status of the pre-requisite for access.

7. A method for bundle management, comprising:
   receiving a bundle by at least one computing device, the bundle comprising a content file and a manifest to manage access to the content file, wherein the bundle is associated with an enterprise platform operated by a company or organization;
   querying, by the at least one computing device, a bundle management server for an update to the bundle;
   in an instance in which the at least one computing device is evaluated against a qualification defined in the manifest for installation of an application on the at least one computing device, automatically obtaining, by the at least one computing device over a computer network and by reference to a pointer in the manifest, the application to open the content file;
   installing, by the at least one computing device, the application on the at least one computing device; and
   opening, by the at least one computing device, the content file on the at least one computing device using the application.

8. The non-transitory computer-readable medium of claim 1, wherein the qualification is one of a plurality of qualifications defined in the manifest, and wherein the pointer in the manifest is one of a plurality of pointers in the manifest.

9. The method of claim 7, wherein the qualification is one of a plurality of qualifications defined in the manifest, and wherein the pointer in the manifest is one of a plurality of pointers in the manifest.

10. The method of claim 9, wherein:
    the manifest further comprises an administration timeframe for the bundle; and
    the method further comprises:
       determining, by the at least one computing device, that the administration timeframe for the bundle has expired;

uninstalling, by the at least one computing device, the application from the at least one computing device; and deleting, by the at least one computing device, the bundle from the at least one computing device.

11. The method of claim 9, wherein:

the manifest further comprises an administration timeframe for the bundle; and the method further comprises:

determining, by the at least one computing device, that the administration timeframe for the bundle has expired;

uninstalling, by the at least one computing device, the application; and deleting, by the at least one computing device, the bundle.

12. The method of claim 9, wherein:

the qualification for installation of the application comprises a profile dependency for access to the content file using the application; and the method further comprises:

evaluating, by the at least one computing device, a status of the profile dependency; and opening, by the at least one computing device, the content file on the at least one computing device based on the status of the profile dependency.

13. The method of claim 9, wherein:

the qualification for installation of the application comprises an operating environment dependency of the at least one computing device for the application; and the method further comprises:

verifying, by the at least one computing device, a condition of the operating environment dependency; and installing, by the at least one computing device, the application on the at least one computing device based on the condition.

14. The method of claim 9, wherein:

the bundle further comprises a second content file;

the manifest comprises a second pointer to obtain a second application to open the second content file and a second qualification for installation of the second application; and the method further comprises:

obtaining, by the at least one computing device, the second application to open the content file over the computer network with reference to the second pointer based on the second qualification for installation of the application;

installing, by the at least one computing device, the second application on the at least one computing device; and opening, by the at least one computing device, the second content file on the at least one computing device using the second application.

15. The method of claim 9, wherein the content file comprises at least one of a video file, a document file, or a music file.

16. A computing device, comprising:

a memory device to store program code for bundle management; and at least one processing device directed, through execution of the program code, to at least:

receive a bundle over a computer network, the bundle comprising a content file and a manifest to manage access to the content file, wherein the bundle is associated with an enterprise platform operated by a company or organization;

query a bundle management server for an update to the bundle;

in an instance in which the at least one computing device is evaluated against a qualification defined in the manifest for installation of an application on the at least one computing device, automatically obtain, over the computer network and by reference to a pointer the enterprise platform provides in the manifest that points to a location in an application repository, the application to open the content file;

install the application on the at least one computing device; and open the content file on the at least one computing device using the application based on a profile dependency defined in the manifest.

17. The computing device of claim 16, wherein:

the manifest further comprises an administration timeframe for the bundle; and the processing device is further directed to at least:

determine that the administration timeframe for the bundle has expired;

uninstall the application from the computing device; and delete the bundle from the computing device.

18. The computing device of claim 16, wherein:

the qualification for installation of the application comprises the profile dependency for access to the content file using the application; and the processing device is further directed to at least:

evaluate a status of the profile dependency; and open the content file on the at least one computing device based on the status of the profile dependency.

19. The computing device of claim 16, wherein:

the qualification for installation of the application comprises an operating environment dependency of the at least one computing device for the application; and the processing device is further directed to at least:

verify a condition of the operating environment dependency; and install the application on the at least one computing device based on the condition.

20. The computing device of claim 16, wherein the qualification is one of a plurality of qualifications defined in the manifest, and wherein the pointer in the manifest is one of a plurality of pointers in the manifest.

* * * * *